United States Patent
Va et al.

(10) Patent No.: US 11,402,465 B2
(45) Date of Patent: Aug. 2, 2022

(54) RADAR LEAKAGE CANCELATION BASED ON SPATIOTEMPORAL RELATIONSHIP OF TRANSMIT AND RECEIVE ANTENNA PAIRS

(71) Applicant: Samsung Electronics Co., Ltd., Suwon-si (KR)

(72) Inventors: Vutha Va, Plano, TX (US); Wenxun Qiu, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 16/667,605

(22) Filed: Oct. 29, 2019

(65) Prior Publication Data
US 2020/0319294 A1     Oct. 8, 2020

Related U.S. Application Data

(60) Provisional application No. 62/829,895, filed on Apr. 5, 2019.

(51) Int. Cl.
*G01S 7/03* (2006.01)
*H01Q 1/52* (2006.01)

(52) U.S. Cl.
CPC .............. *G01S 7/038* (2013.01); *H01Q 1/525* (2013.01)

(58) Field of Classification Search
CPC .................................. G01S 7/038; H01Q 1/525
See application file for complete search history.

(56) References Cited

U.S. PATENT DOCUMENTS

| | | | | |
|---|---|---|---|---|
| 2006/0273952 A1* | 12/2006 | Krikorian | ............... | G01S 7/038 342/159 |
| 2013/0102254 A1* | 4/2013 | Cyzs | ....................... | H04B 1/10 455/63.1 |
| 2015/0036773 A1* | 2/2015 | Lakkis | ................... | H04B 1/525 375/351 |

(Continued)

FOREIGN PATENT DOCUMENTS

| | | |
|---|---|---|
| JP | 2010-032307 A | 2/2010 |
| WO | 9919744 A1 | 4/1999 |

OTHER PUBLICATIONS

Choi, et al., "Achieving Single Channel, Full Duplex Wireless Communication," in Proceedings of Sixteenth Annual International Conference on Mobile Computing and Networking (MobiCom'10), ACM, Chicago, IL, USA, Sep. 2010, 12 pages.

(Continued)

*Primary Examiner* — Marcus E Windrich

(57) ABSTRACT

A method and electronic device for leakage cancellation. The electronic device includes a first antenna pair, a memory, and a processor. The first antenna pair includes a first transmitter antenna configured to transmit signals and a first receiver antenna configured to receive signals. The memory is configured to store data. The processor is configured to identify, from the data stored in the memory, a first leakage factor associated with at least the first antenna pair, control the first transmitter antenna to transmit a first signal, generate a first CIR based on receipt, by the first receiver antenna, of reflection of the first signal, determine leakage in the first CIR based on at least the identified first leakage factor, and cancel the determined leakage from the first CIR.

20 Claims, 7 Drawing Sheets

(56) References Cited

U.S. PATENT DOCUMENTS

| | | | |
|---|---|---|---|
| 2018/0031695 A1 | 2/2018 | Carswell et al. | |
| 2018/0106884 A1* | 4/2018 | Marr | G01S 7/352 |
| 2018/0248261 A1 | 8/2018 | Parker et al. | |
| 2018/0293886 A1 | 10/2018 | Frederick et al. | |
| 2018/0309474 A1* | 10/2018 | Cheung | H04B 1/44 |
| 2020/0003866 A1* | 1/2020 | Bauduin | G01S 7/354 |
| 2020/0326422 A1* | 10/2020 | Sagi | G01S 13/9047 |
| 2021/0359415 A1* | 11/2021 | Takaki | H01Q 1/48 |

OTHER PUBLICATIONS

Korpi, et al., "Compact Inband Full-Duplex Relays with Beyond 100 dB Self-Interference Suppression: Enabling Techniques and Field Measurements," IEEE Transactions on Antennas and Propagation, vol. 65, No. 2, Nov. 2016, 6 pages.

International Search Report and Written Opinion of the International Searching Authority in connection with International Application No. PCT/KR2020/002806 dated Jun. 29, 2020, 7 pages.

Extended European Search Report dated Feb. 15, 2022 regarding Application No. 20785321.9, 8 pages.

* cited by examiner

RADAR LEAKAGE CANCELATION BASED ON SPATIOTEMPORAL RELATIONSHIP OF TRANSMIT AND RECEIVE ANTENNA PAIRS

CROSS-REFERENCE TO RELATED APPLICATION AND CLAIM OF PRIORITY

This application claims priority under 35 U.S.C. § 119(e) to U.S. Provisional Patent Application No. 62/829,895 filed Apr. 5, 2019, the contents of which is incorporated herein by reference in its entirety.

TECHNICAL FIELD

The present disclosure relates generally to removing leakage in radar applications. More specifically, the present disclosure relates to leakage removal for radar applications based on a spatiotemporal relationship of transmitting and receiving antennas.

BACKGROUND

Radar operates to localize targets in the radar field of view in terms of range and/or angle (azimuth and/or elevation) and/or velocity. For certain types of radars, the transmitter and the receiver can be installed closely together, resulting in signals that are transmitted by the transmitter being received directly by the receiver or bounced off some component or components of the device to reach the receiver. This signal is referred to as a leakage signal. The leakage signal interferes with radar detection and ranging. Due to the presence of sometimes strong leakage signals, detection or range estimation is challenging. In particular, detection or range estimation is challenging for close-range distances of comparable values to the separation between the transmitter and the receiver because the leakage masks the actual target object. Detection at a close range can be compromised due to strong leakage that can mask the target. Even assuming the detection is successful, range estimation can be inaccurate due to the leakage distorting the target response.

One way to overcome this challenge is to compensate for or cancel the leakage signals. Cancellation of leakage signals helps to enable reliable detection of a target object and accurate estimation of the range of the target in the proximity range of the radar. The proximity range generally refers to distances below 20 cm, such as below 10 cm. The radar as described herein can operate at various frequency bands including, but not limited to, 6-8 GHz, 28 GHz, 39 GHz, 60 GHz, and 77 GHz.

Current methods of separating the contribution of the leakage from the contribution of the target assume that either the target contribution or the leakage contribution can be suppressed by some means. For example, current methods utilize knowledge of the target location, control the changing of the location of the target, or control the suppressing target contribution to received signal.

SUMMARY

Embodiments of the present disclosure include a method, an electronic device, and a non-transitory computer readable medium for leakage cancellation. In one embodiment, the electronic device includes a first antenna pair, a memory, and a processor. The first antenna pair includes a first transmitter antenna configured to transmit signals and a first receiver antenna configured to receive signals. The memory is configured to store data. The processor is configured to identify, from the data stored in the memory, a first leakage factor associated with at least the first antenna pair, control the first transmitter antenna to transmit a first signal, generate a first CIR based on receipt, by the first receiver antenna, of reflection of the first signal, determine leakage in the first CIR based on at least the identified first leakage factor, and cancel the determined leakage from the first CIR.

In another embodiment, a method of canceling leakage includes identifying, from data stored in a memory of an electronic device, a first leakage factor associated with at least a first antenna pair of the electronic device, the first antenna pair comprising a first transmitter antenna and a first receiver antenna, transmitting, via the first transmitter antenna, a first signal, generating a first CIR based on receipt, by the first receiver antenna, of reflection of the first signal, determining leakage in the first CIR based on at least the identified first leakage factor, and canceling the determined leakage from the first CIR.

In another embodiment, an electronic device includes a non-transitory computer readable medium. The non-transitory computer readable medium stores instructions that, when executed by the processor, cause the processor to identify, from data stored in a memory of an electronic device, a first leakage factor associated with at least a first antenna pair of the electronic device, the first antenna pair comprising a first transmitter antenna and a first receiver antenna, control the first transmitter antenna to transmit, via the first transmitter antenna, a first signal, generate a first CIR based on receipt, by the first receiver antenna, of reflection of the first signal, determine leakage in the first CIR based on at least the identified first leakage factor, and cancel the determined leakage from the first CIR.

Other technical features may be readily apparent to one skilled in the art from the following figures, descriptions, and claims.

Before undertaking the DETAILED DESCRIPTION below, it may be advantageous to set forth definitions of certain words and phrases used throughout the present disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout the present disclosure. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which like reference numerals represent like parts.

DETAILED DESCRIPTION

FIGS. 1 through 10, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged wireless communication system.

Figure 1:
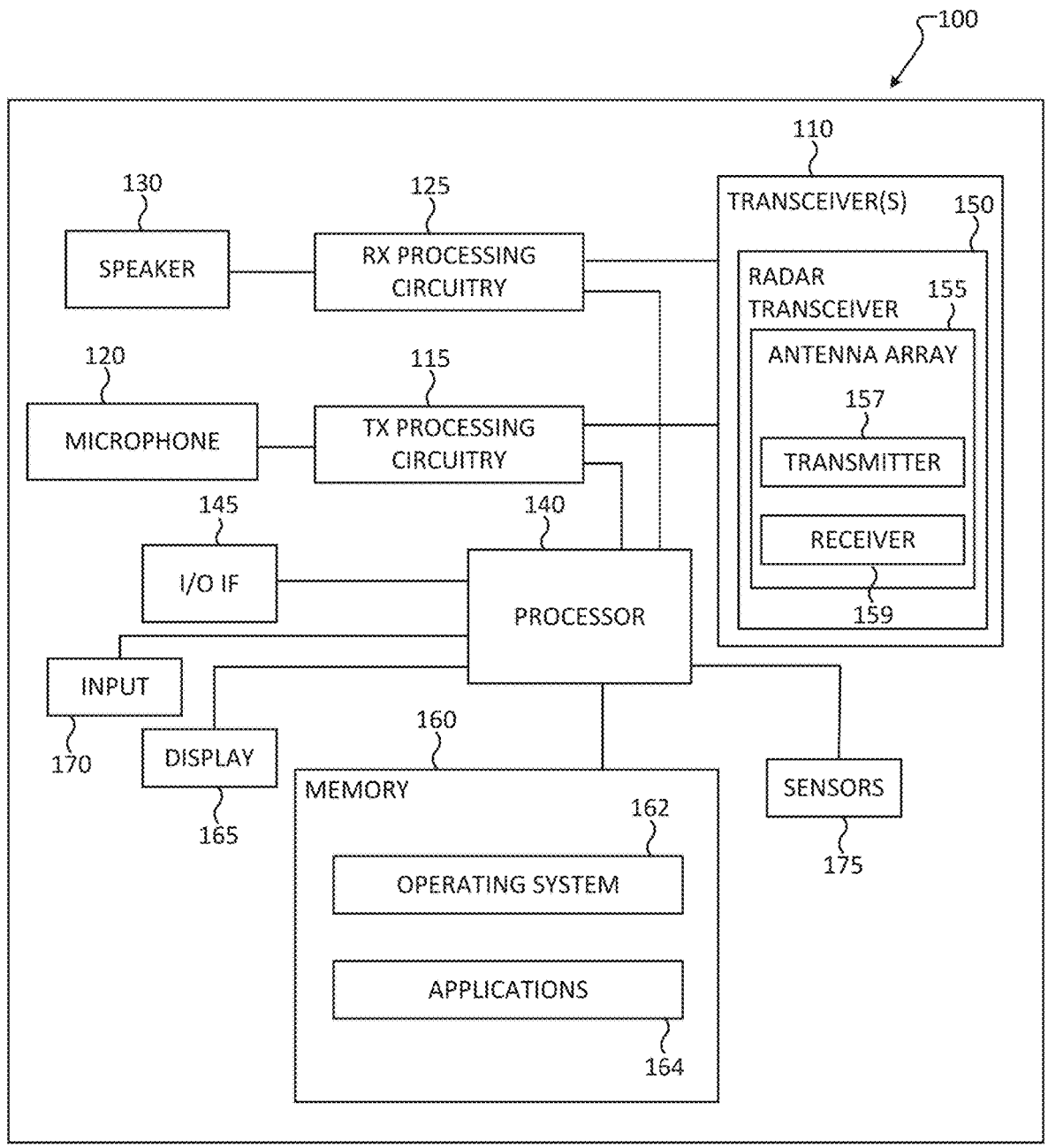
FIG. 1 illustrates an electronic device according to various embodiments of the present disclosure.

FIG. 1 illustrates an electronic device according to various embodiments of the present disclosure. The embodiment of the electronic device 100 shown in FIG. 1 is for illustration only. Other embodiments can be used without departing from the scope of the present disclosure.

As shown in FIG. 1, the electronic device 100 includes a radio frequency (RF) transceiver 110, transmit (TX) processing circuitry 115, a microphone 120, receive (RX) processing circuitry 125, a speaker 130, a processor 140, an input/output (I/O) interface (IF) 145, a memory 160, a display 165, an input 170, and sensors 175. The memory 160 includes an operating system (OS) 162 and one or more applications 164.

The transceiver 110 transmits signals to other components in a system and receives incoming signals transmitted by other components in the system. For example, the transceiver 110 transmits and receives RF signals, such as BLUETOOTH or WI-FI signals, to and from an access point (such as a base station, WI-FI router, BLUETOOTH device) of a network (such as a WI-FI, BLUETOOTH, cellular, 5G, LTE, LTE-A, WiMAX, or any other type of wireless network). The received signal is processed by the RX processing circuitry 125. The RX processing circuitry 125 may transmit the processed signal to the speaker 130 (such as for voice data) or to the processor 140 for further processing (such as for web browsing data). The TX processing circuitry 115 receives voice data from the microphone 120 or other outgoing data from the processor 140. The outgoing data can include web data, e-mail, or interactive video game data. The TX processing circuitry 115 processes the outgoing data to generate a processed signal. The transceiver 110 receives the outgoing processed signal from the TX processing circuitry 115 and converts the received signal to an RF signal that is transmitted via an antenna. In other embodiments, the transceiver 110 can transmit and receive radar signals to detect the potential presence of an object in the surrounding environment of the electronic device 100.

In this embodiment, one of the one or more transceivers in the transceiver 110 includes a radar transceiver 150 configured to transmit and receive signals for detection and ranging purposes. For example, the radar transceiver 150 may be any type of transceiver including, but not limited to a WiFi transceiver, for example, an 802.11ay transceiver. The radar transceiver 150 includes an antenna array 155 that includes transmitter 157 and receiver 159 antenna arrays. The transmitter 157 can transmit signals at frequencies including, but not limited to, 6-8 GHz, 28 GHz, 39 GHz, 60 GHz, and 77 GHz. In some embodiments, the signals transmitted by the radar transceiver 150 can include, but are not limited to, millimeter wave (mmWave) signals. The radar transceiver 150 can receive the signals, which were originally transmitted from the radar transceiver 150, after the signals have bounced or reflected off of target objects in the surrounding environment of the electronic device 100. The processor 140 can analyze the time difference between when the signals are transmitted by the radar transceiver 150 and received by the radar transceiver 150 to measure the distance of the target objects from the electronic device 100.

The transmitter 157 and the receiver 159 can be fixed near in proximity to each other such that the distance of separation between them is small. For example, the transmitter 157 and the receiver 159 can be located within a few centimeters of each other. In some embodiments, the transmitter 157 and the receiver 159 can be co-located in a manner that the distance of separation is indistinguishable. Based on the fixed, constant spatiotemporal relationship of the transmitter 157 and the receiver 159, the processor 140 can use information regarding the spatiotemporal relationship of the transmitter 157 and the receiver 159 to cancel leakage, such as radar leakage, in a response signal resulting from a transmitted radar signal leaking to the receiver 159. For example, the response signal can be a channel impulse response (CIR) as further described herein in FIG. 3.

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The transceiver 110 receives the outgoing processed baseband or IF signal from the TX processing circuitry 115 and up-converts the baseband or IF signal to an RF signal that is transmitted via the antenna 105.

The processor 140 is also capable of executing the operating system 162 in the memory 160 in order to control the overall operation of the electronic device 100. For example, the processor 140 can move data into or out of the memory 160 as required by an executing process. In some embodiments, the processor 140 is configured to execute the applications 164 based on the OS program 162 or in response to signals received from external devices or an operator. In some embodiments, the memory 160 is further configured to store data, such as one or more leakage factors, that the processor 140 can utilize to perform leakage cancellation as described herein. In some embodiments, the processor 140 can control the reception of forward channel signals and the transmission of reverse channel signals by the transceiver 110, the RX processing circuitry 125, and the TX processing circuitry 115 in accordance with well-known principles. In some embodiments, the processor 140 includes at least one microprocessor or microcontroller.

The processor 140 is also coupled to the I/O interface 145, the display 165, the input 170, and the sensor 175. The I/O interface 145 provides the electronic device 100 with the ability to connect to other devices such as laptop computers and handheld computers. The I/O interface 145 is the communication path between these accessories and the processor 140. The display 165 can be a liquid crystal display (LCD), light-emitting diode (LED) display, organic LED (OLED), active matrix OLED (AMOLED), or other display capable of rendering text and/or graphics, such as from websites, videos, games, images, and the like.

The processor 140 can be coupled to the input 170. An operator of the electronic device 100 can use the input 150 to enter data or inputs into the electronic device 100. Input 150 can be a keyboard, touch screen, mouse, track-ball, voice input, or any other device capable of acting as a user interface to allow a user in interact with electronic device 100. For example, the input 150 can include voice recognition processing thereby allowing a user to input a voice command via microphone 120. For another example, the input 150 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme.

The electronic device 100 can further include one or more sensors 175 that meter a physical quantity or detect an activation state of the electronic device 100 and convert metered or detected information into an electrical signal. For example, sensor(s) 175 may include one or more buttons for touch input, one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, a fingerprint sensor, and the like. The sensor(s) 175 can further include a control circuit for controlling at least one of the sensors included therein.

In various embodiments, the electronic device 100 may be a phone or tablet. In other embodiments, the electronic device 100 may be a robot or any other electronic device using a radar transceiver. FIG. 1. does not limit the present disclosure to any particular type of electronic device.

Figure 2:
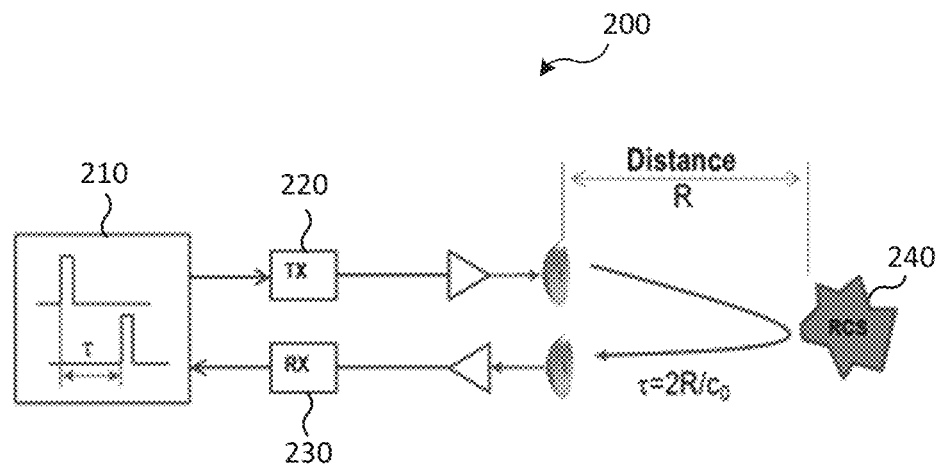
FIG. 2 illustrates a monostatic radar according to various embodiments of the present disclosure.

FIG. 2 illustrates a monostatic radar according to various embodiments of the present disclosure. The embodiment of the monostatic radar 200 shown in FIG. 2 is for illustration only. Other embodiments can be used without departing from the scope of the present disclosure. The monostatic radar 200 illustrated in FIG. 2 includes a processor 210, a transmitter 220, and a receiver 230. In some embodiments, the processor 210 can be the processor 140.

In some embodiments, the transmitter 220 and the receiver 230 can be the transmitter 157 and receiver 159, respectively, included in the antenna arrays 155. In various embodiments, the transmitter 220 and the receiver 230 are co-located using a common antenna or nearly co-located while separate but adjacent antennas. The monostatic radar 200 is assumed to be coherent such that the transmitter 220 and the receiver 230 are synchronized via a common time reference.

The processor 210 controls the transmitter 220 to transmit a radar signal or radar pulse. The radar pulse is generated as a realization of a desired "radar waveform" modulated onto a radio carrier frequency and transmitted through a power amplifier and antenna (shown as a parabolic antenna), such as the transmitter 220, either omni-directionally or focused into a particular direction. After the radar pulse has been transmitted, a target 240 at a distance R from the radar 200 and within a field-of-view of the transmitted pulse will be illuminated by RF power density $p_t$ (in units of W/m$^2$) for the duration of the transmission. To the first order, $p_t$ is described by Equation 1:

$$P_t = \frac{P_T}{4\pi R^2} G_T = \frac{P_T A_T}{4\pi R^2 (\lambda^2/4\pi)} = P_T \frac{A_T}{\lambda^2 R^2},$$

where $P_T$ is a transmit power [W], $G_T$, is a transmit antenna gain [dBi], $A_T$ is an effective aperture area [m$^2$], $\lambda$ is a wavelength of the radar signal RF carrier signal [m], and R is the target distance [m].

The transmit power density impinging onto the target surface leads to reflections depending on the material composition, surface shape, and dielectric behavior at the frequency of the radar signal. Off-direction scattered signals are generally not strong enough to be received back at the receiver 230, so only direct reflections contribute to a detectable, received signal. Accordingly, the illuminated area or areas of the target with normal vectors directing back to the receiver 230 act as transmit antenna apertures with directivities, or gains, in accordance with their effective aperture area or areas. The reflected-back power $P_{refl}$ is described by Equation 2:

$$P_{refl} = p_t A_t G_t \sim p A r_t \frac{A_t}{(\lambda^2/4\pi)} = p_t RCS,$$

where $P_{refl}$ is an effective (isotropic) target-reflected power [W], $A_t$ is an effective target area normal to the radar direction [m2], $r_t$ is a reflectivity of the material and shape [0, ..., 1], $G_t$ is a corresponding aperture gain [dBi], and RCS is a radar cross section [m²]. As shown in Equation 2, the corresponding aperture gain [dBi] ($G_t$) is approximately the same as the reflectivity of the material and shape [0, ..., 1] ($r_t$) multiplied by the result of the effective target area normal ($A_t$) divided by (i) the wavelength squared divided by (ii) four times π.

As depicted in Equation 2, the radar cross section (RCS) is an equivalent area that scales proportionally to the square of the actual reflecting area, is inversely proportional to the square of the wavelength, and is reduced by various shape factors and the reflectivity of the material itself. For example, for a flat, fully reflecting mirror of an area $A_t$, large compared with $\lambda^2$, RCS=$4\pi A_t^2/\lambda^2$. Due to the material and shape dependency, it is difficult to deduce the actual physical area of the target 240 based on the reflected power even if the distance R from the target to the radar 200 is known.

The target-reflected power at the location of the receiver 230 is based on the reflected-power density at the reverse distance R, collected over the receiver antenna aperture area. The received, target-reflected power $P_R$ is described by Equation 3:

$$P_R = \frac{P_{refl}}{4\pi R^2} A_R = P_T \cdot RCS \frac{A_T A_R}{4\pi \lambda^2 R^4},$$

where $P_R$ is the received, target-reflected power [W] and $A_R$ is the receiver antenna effective aperture area [m²]. In some embodiments, $A_R$ can be the same as $A_T$.

Such a radar system is usable as long as the receiver signal exhibits a sufficient signal-to-noise ratio (SNR). The particular value of the SNR depends on the waveform and detection method used. The SNR is described by Equation 4:

$$SNR = \frac{P_R}{kT \cdot B \cdot F},$$

where kT is Boltzmann's constant x temperature [W/Hz], B is the radar signal bandwidth [Hz], and F is the receiver noise factor, referring to the degradation of receive signal SNR due to noise contributions to the receiver circuit itself.

In some embodiments, the radar signal can be a short pulse with a duration, or width, denoted by $T_P$. In these embodiments, the delay τ between the transmission and reception of the corresponding echo will be equal to τ=2R/c, where c is the speed of light propagation in the medium, such as air. In some embodiments, there can be several targets 240 at slightly different distances R. In these embodiments, the individual echoes of each separate target 240 is distinguished as such only if the delays differ by at least one pulse width, and the range resolution of the radar is described as $\Delta R = c\Delta\tau/2 = cT_P/2$. A rectangular pulse of duration $T_P$ exhibits a power spectral density P(f)~(sin (π$fT_P$)/(π$fT_P$))² with the first null at its bandwidth B=1/$T_P$. Therefore, the connection of the range resolution of a radar with the bandwidth of the radar waveform is described by Equation 5:

$$\Delta R = c/2B$$

Based on the reflected signals received by the receiver 230, the processor 210 generates a metric that measures the response of the reflected signal as a function of the distance of the target 240 from the radar. In some embodiments, the metric can be a channel impulse response (CIR).

Figure 3:
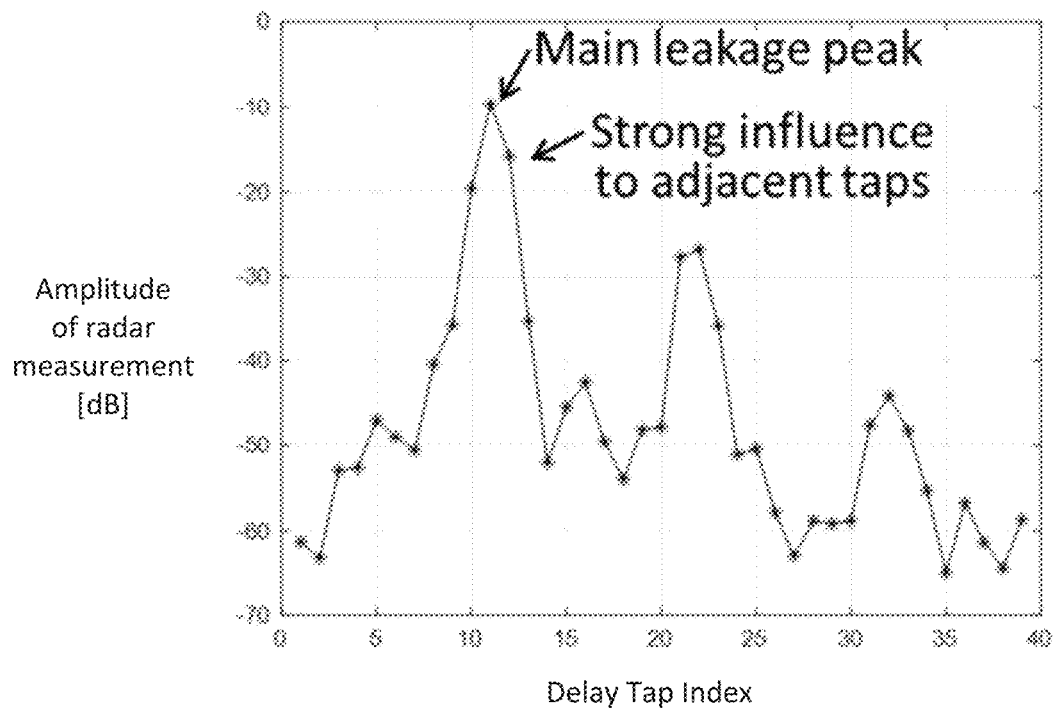
FIG. 3 illustrates an example of a channel impulse response (CIR) according to various embodiments of the present disclosure.

FIG. 3 illustrates an example of a CIR depicting a measured leakage response according to various embodiments of the present disclosure. The CIR is a response metric based on the signals received by the receiver 230. For example, the CIR is a measure of amplitude and/or phase of a reflected signal as a function of distance. As shown in FIG. 3, the CIR is depicted with the delay tap index denoted on the x-axis, measuring the distance, and the amplitude of the radar measurement [dB] denoted on the y-axis. In a monostatic radar, for example the radar 200, that has separate transmitting and receiving antenna modules, a strong signal can radiate directly from the transmitter 220 to the receiver 230 causing a strong response at the delay corresponding to the separation between the transmitter 220 and receiver 230. The strong signal radiating from the transmitter 220 to the receiver 230 is referred to as a leakage signal. Even if the direct leakage signal from the transmitter 220 can be assumed to correspond to a single delay, the effect of the direct leakage signal can still impact multiple delay taps adjacent to the direct leakage signal.

In the measured leakage response illustrated in FIG. 3, the main leakage peak is denoted at tap 11. In addition, taps 10 and 12 also have strong responses, noted by the responses being greater than 20 dB above the noise floor. Because of the additional responses such as shown at taps 10 and 12, it is difficult to reliably detect and estimate the target range within those first few taps from the leakage taps.

Figure 4:
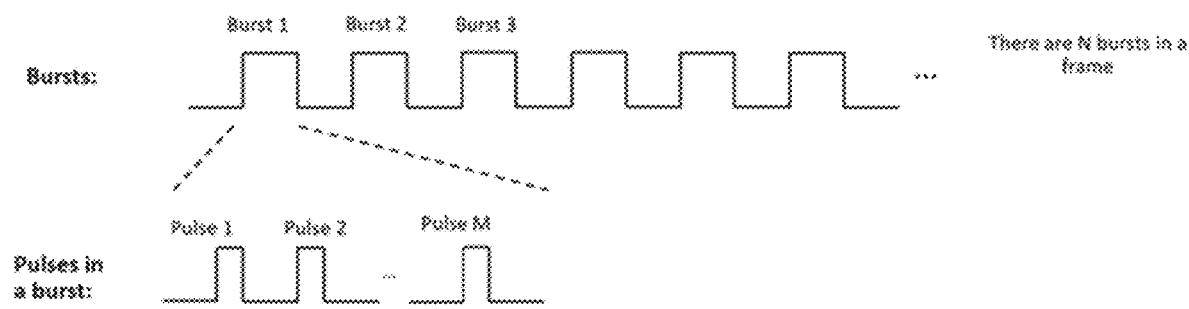
FIG. 4 illustrates a timing diagram for radar transmission according to various embodiments of the present disclosure.

FIG. 4 illustrates a timing diagram for radar transmission according to various embodiments of the present disclosure. In particular, FIG. 4 illustrates a frame structure that divides time into frames. Each frame comprises multiple bursts. Each burst includes a plurality of pulses. The timing diagram illustrated in FIG. 4 assumes an underlying pulse compression radar system.

As illustrated in FIG. 4, each frame includes a number of bursts N, illustrated as Burst 1, Burst 2, Burst 3, etc. Each burst further includes a plurality of pulses. For example, FIG. 4 illustrates that Burst 1 comprises a plurality of pulses referenced as Pulse 1, Pulse 2, etc. through Pulse M.

For example, in Burst 1 a radar transceiver, such as the transmitter 157, can transmit Pulse 1, Pulse 2, and Pulse M, where M represents the final pulse in the burst. For simplicity of description, the present description assumes Pulse M is a third pulse, but this description should not be construed as limiting. In various embodiments, M can be a third pulse or any number of pulses. In Burst 2, the transmitter 157 can transmit similar pulses Pulse 1, Pulse 2, and Pulse M. Each different pulse (Pulse 1, Pulse 2, and Pulse M) and burst (Burst 1, Burst 2, Burst 3, etc.) can utilize a different transmission/reception antenna configuration, that is the active set of antenna elements and corresponding analog/digital beamforming weights, to identify the specific pulses and bursts. For example, each pulse or burst can utilize a different active set of antenna elements and corresponding analog/digital beamforming weights to identify specific pulses and bursts.

Following each frame, a processor, such as the processor 140, connected to the transmitter 157 obtains radar measurements at the end of each frame. For example, the radar measurements can be depicted as a three-dimensional complex CIR matrix. The first dimension may correspond to the burst index, the second dimension may correspond to the pulse index, and the third dimension may correspond to the delay tap index. The delay tap index can be translated to the measurement of range or time of flight of the received signal.

Several types of leakage cancellation methods that leverage the relationship between one or more transmitting and receiving antenna pairs across space and time can be utilized as described in the present disclosure. The leakage cancellation methods described herein exploit the constant relationship between the transmitting and receiving antenna pairs to reconstruct the leakage signals from past observations of the same antenna pair or current measurements as seen by other transmit and receive antenna pairs. These embodiments are broadly illustrated in FIG. 5.

Figure 5:
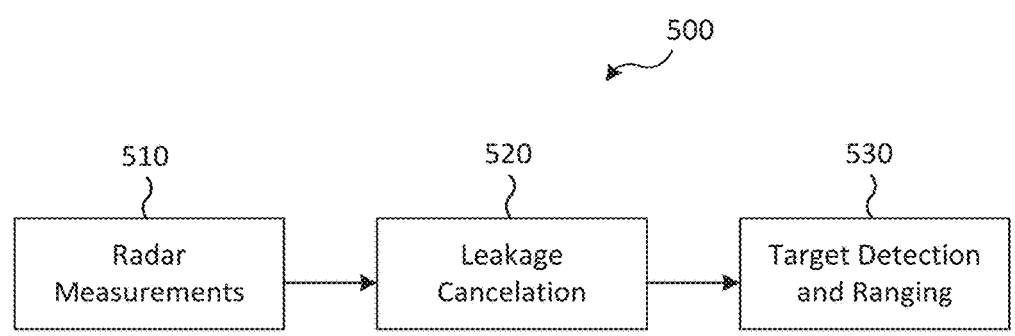
FIG. 5 illustrates a method for target detection and ranging according to various embodiments of the present disclosure.

FIG. 5 illustrates a method for target detection and ranging according to various embodiments of the present disclosure. The embodiment of the method 500 shown in FIG. 5 is for illustration only. Other embodiments that include additional operations or fewer operations can be used without departing from the scope of the present disclosure.

In operation 510, radar measurements are obtained as described in greater detail herein. The radar measurements can include storing data regarding the fixed positions of the transmitting and receiving antenna pairs in the memory 160 as well as obtaining a CIR profile as described in FIGS. 2-4.

In operation 520, the processor 140 performs leakage cancellation. The leakage cancellation can be performed based on information regarding the stored relationship between one or more transmitting and receiving antenna pairs across space and time, previous leakage cancellation operations, and the obtained CIR such as the CIR illustrated in FIG. 3. The leakage cancellation cancels the raw radar received signals that correspond to leakage rather than a target. In some embodiments, operation 520 can include additional steps such as combining leakage of one or more antenna pairs, utilizing a stored leakage factor stored in a template in the memory 160, and performing presence detection of a potential target object in the surrounding environment of the electronic device 100. Various embodiments of performing leakage cancellation will be further described herein.

In operation 530, the processor 140 performs target detection and ranging based on the results of the leakage cancellation. For example, the processor 140 can detect a target based on a peak remaining in the CIR after the leakage has been canceled. The processor 140 can further determine the distance of the detected target based on the tap index as shown in the CIR illustrated in FIG. 2.

The method of target detection and ranging described in FIG. 5 is not restricted to target detection but also can be used for non-conventional use such as context detection. The method of target detection and ranging described in FIG. 5 further does not rely on movement of either the target or electronic device 100 and is robust to changes in leakage, for example common phase and amplitude jumps.

Figure 6:
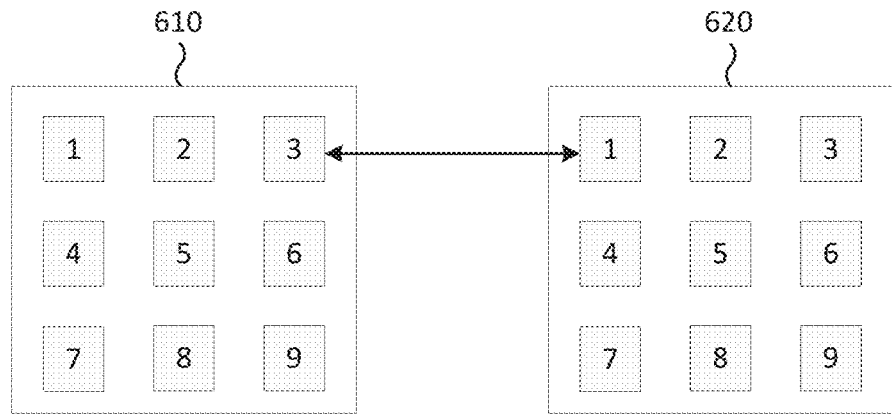
FIG. 6 illustrates a transmission antenna array and a reception antenna array according to various embodiments of the present disclosure.

FIG. 6 illustrates a transmission antenna array and a reception antenna array according to various embodiments of the present disclosure. In particular, FIG. 6 illustrates a transmission antenna array 610 and a reception antenna array 620. The transmission antenna array 610 and reception antenna array 620 can be provided in a device such as the electronic device 100 or the radar 200. For example, the transmission antenna array 610 and reception antenna array 620 can be the transmitter 157 and receiver 159, respectively, included in the antenna arrays 155. As another example, the transmission antenna array 610 can be the transmitter 220 and the reception antenna array 620 can be the receiver 230.

As illustrated in FIG. 6, the transmission antenna array 610 includes nine transmission elements (e.g. 1-9) arranged in a 3×3 pattern. Although depicted as nine transmission elements arranged in a 3×3 pattern, this embodiment should not be construed as limiting and other embodiments are possible. Any suitable quantity of transmission elements can be included, and the transmission elements can be arranged in any suitable configuration. Further, the reception antenna array 620 includes nine reception elements (e.g. 1-9) arranged in a 3×3 pattern. Although depicted as nine reception elements arranged in a 3×3 pattern, this embodiment should not be construed as limiting and other embodiments are possible. Any suitable quantity of reception elements can be included, and the reception elements can be arranged in any suitable configuration.

The transmission antenna array 610 and reception antenna array 620 are disposed, or installed, on the electronic device 100 at fixed positions as illustrated in FIG. 6. Regardless of the particular configuration, because of the fixed positions of the transmission antenna array 610 and reception antenna array 620, the distance of separation and the angular relationships between the transmission antenna array 610 and reception antenna array 620 are constant and time-invariant. For example, the transmission antenna array 610-3 maintains a constant distance and angle from the reception antenna array 620-1, noted by the arrow in FIG. 6. By positioning the transmission antenna array 610 and reception antenna array 620 in a fixed, constant, and time-invariant position, the transmission antenna array 610 and reception antenna array 620 can be defined by the constant spatiotemporal relationship that can be used to cancel radar leakage of the transmission antenna array 610 and reception antenna array 620.

The distance separation determines the propagation attenuation level and the directional relationship determines the antenna gain (according to the radiation pattern) of the transmission antenna array 610 and reception antenna array 620. The propagation attenuation level and the antenna gain are some of the transformations that a leakage signal goes through, beginning with the digital transmit symbol, until the leakage signal is received and demodulated as the digital baseband received signal. Another transformation includes the combined response of the transmit and receive filters, which include the pulse-shaping filter at the transmitter antenna array 610 and the matched filter at the reception antenna array 620. The combined response is typically constant as long as the sampling timing remains unchanged. When the transformations are unchanged, they are able to be exploited by the processor 140 to reconstruct leakage signals from prior measurements or current measurements as seen by other antenna pairs and can be used to cancel the leakage contribution in the raw radar signals.

In various embodiments, a transmit and receive antenna pair can be referred to as k. for example, element 1 of the transmission antenna array 610 and element 1 of the reception antenna array 620 can form an antenna pair and be referred to as k. Another transmit and receive antenna pair can be referred to as l. For example, element 9 of the transmission antenna array 610 and element 9 of the reception antenna array 620 can form an antenna pair and be referred to as l. Although k and l are described herein as describing elements 1 and 9 of both antenna arrays 610, 620, respectively, each of k and l can refer to any pair of transmission and reception antenna arrays.

When the antenna pairs transmit orthogonal transmissions, the leakage $L_k$ for each antenna pair, for example antenna pair k, can be defined by multiplying the antenna gain of the reception antenna, antenna gain of the transmission antenna, propagation loss between the antenna pair, and filter response as seen by the pair. For example, when the CIR of the leakage at the delay tap n is defined as $L_k[n]$, then $L_k[n]$ can be determined by Equation 6:

$$L_k[n] = G_{R,k} \alpha_k G_{T,k} p_k[n]$$

where n is the delay tap as received via the transmit and receive antenna pair k, $G_{R,k}$ is the antenna gain of the receive antenna, $G_{T,k}$ is the antenna gain of the transmit antenna, $\alpha_k$ the propagation loss between the antenna pair, and $p_k[n]$ is the combined filter response as seen by the pair. Likewise, the leakage for the antenna pair l can be defined as $L_l[n] = G_{R,l} \alpha_l G_{T,l} p_l[n]$. In some embodiments, the leakage measurements $L_k[n]$ can be obtained by measuring the $CIR_k[n]$ when there is no target in proximity of the radar.

When the sampling timing between the two antenna pairs k and l is the same, a constant factor between k and l can be determined to more accurately cancel the leakage. The filter response for each pair can be the same because of the constant spatial relationship between the two pairs. The same filter response is denoted as $p_k[n] = p_l[n]$ for all n. Therefore, the leakage signals as determined by k and l differ by a constant factor, $\beta$, determined by Equation 7, assuming index n=0 corresponds to the leakage peak:

$$\beta = \frac{L_k[n]}{L_l[n]} = \frac{G_{R,k} \alpha_k G_{T,k}}{G_{R,l} \alpha_l G_{T,l}}$$

The constant factor $\beta$ can also be referred to as a compensation factor $\beta$, a scaling factor $\beta$, a leakage factor, or a leakage scaling factor $\beta$. The leakage factor $\beta$ can be stored in a template in the memory 160 to be used for future determinations. For example, a stored $\beta$ of the CIR with target contributions that is received by pair l can be used to reconstruct leakage as observed by pair k and accordingly cancel leakage signals from the received CIR of pair k. For example, if $CIR_k[n]$ and $CIR_l[n]$ denote the CIR received by pair k and pair l, respectively, with target contributions, then a leakage canceled CIR, denoted as $CIR_{can,k}[n]$, received by pair k can be obtained by Equation 8:

$$CIR_{can,k}[n] = CIR_k[n] - \beta CIR_l[n]$$

The cancellation of Equation 8 cancels out leakage because leakage factor $\beta$ is calculated and stored to match the leakage. The leakage canceled CIR received by pair l can be computed in a similar manner by using l instead of k and using the inverse of $\beta$ as the scaling factor. For the contribution of a target, this factor does not compensate for different scaling and the target signal is not canceled out. In these embodiments, the canceled $CIR_{can,k}[n]$ can then be input into a detection and ranging system for further processing. In some embodiments, the canceled $CIR_{can,k}[n]$ can also be stored for further processing at a later time.

In some embodiments, the cancellation, i.e. subtraction, can be performed for each antenna pair in a range of indices. For example, the cancellation can be performed between element 1 of the transmitter antenna array 610 and the reception antenna array 620 and between element 2 of the transmitter antenna array 610 and the reception antenna array 620, between element 1 of the transmitter antenna array 610 and the reception antenna array 620 and between element 3 of the transmitter antenna array 610 and the reception antenna array 620, and so forth. In other embodiments, the cancellation can be performed only for the range of delay tap indices that are expected to be affected by the leakage, denoted by N, rather than for all indices. For indices that are not expected to be affected by the leakage, the original CIR received by the pair k can be maintained. This embodiment is described by $CIR_{can,k}[n] = CIR_k[n]$ for all $n \notin N$. Because the leakage factor $\beta$ is time-invariant, the leakage factor $\beta$ can be measured, or precomputed, and then stored in the memory 160 for canceling leakage at a later time. For example, the leakage factor $\beta$ can be measured and stored in a template in the memory 160 as a part of the manufacturing process to accurately measure device-specific leakage factors $\beta$.

In some embodiments, the combined filter response is not the same for each antenna pair. For example, the difference in the filter response can be due to a difference in the sampling timing of the leakage signal. The sampling timing can be a fractional of the symbol period of the baseband signal. Differences in the sampling timing of the leakage signal can be due to a link distance between the two pairs k and l being great enough to lead to a different exact fractional sampling time of the leakage by the two pairs k and l. This can lead to different combined filter responses. When the combined filter response is different, the leakage is seen by one antenna pair cannot be translated to the leakage observed via another antenna pair by a single leakage factor $\beta$ and a separate leakage factor $\beta$ is used for each index. Because the leakage is to be canceled, the scaling factor near the leakage peak index is determined. For a set of indices N, the leakage factor $\beta[n]$ for the set of indices N in the range can be determined by Equation 9:

$$\beta[n] = \frac{L_k[n]}{L_l[n]} = \frac{G_{R,k} \alpha_k G_{T,k} p_k[n]}{G_{R,l} \alpha_l G_{T,l} p_l[n]}, \text{ for } n \in N$$

As shown in Equation 9, leakage scaling factor $\beta[n]$ can be determined by dividing the first CIR for [k] by the second CIR for [l]. In particular, the first CIR for [k] can be generated by the receiver antenna gain $G_{R,k}$ of the first antenna pair, the propagation coefficient $\alpha_k$ of the first antenna pair, the transmitter antenna gain $G_{T,k}$ of the first antenna pair, and the transmitter and receiver combined filter response $p_k[n]$ of the first antenna pair. Similarly, the second CIR for [l] can be generated by the receiver antenna gain $G_{R,l}$ of the second antenna pair, the propagation coefficient $\alpha_l$ of the second antenna pair, the transmitter antenna gain $G_{T,l}$ of the second antenna pair, and the transmitter and receiver combined filter response $p_l[n]$ of the second antenna pair.

Once the leakage scaling factor $\beta[n]$ is obtained, the leakage scaling factor $\beta[n]$ can be used to cancel the leakage using Equation 10:

$$CIR_{can,k}[n] = \begin{cases} CIR_k[n] - \beta[n] CIR_l[n] & \text{for } n \in N \\ CIR_k[n] & \text{for } n \notin N \end{cases}$$

The leakage factor $\beta[n]$ is time-invariant because of the fixed spatial relationships between antenna pairs k and l. Therefore, the leakage factor $\beta[n]$ can be measured and stored in the memory 160. For example, the leakage factor $\beta[n]$ can be measured and stored in the memory 160 as a part of the manufacturing process to accurately measure device-specific leakage factors β[n]. The processor 140 can then identify the leakage factor β[n] associated with the antenna pair k and l.

As described above, the leakage CIR is the signal transformed by the antenna gains, the propagation attenuation, and the combined filter response to reach the receiver. A scaling factor θ of a single antenna pair can be determined and used to measure the cancellation of the leakage CIR. The scaling factor θ can also be referred to as a leakage factor θ. The leakage factor θ can be determined by Equation 11:

$$\min_{\theta} \sum_{n \in N} |CIR_k[n] - \theta L_k[n]|$$

where $L_k[n]$ is the leakage CIR measured beforehand and stored on the device and N is the range of indices expected to be affected by the leakage. Although depicted herein as using the absolute difference between the canceled leakage and the scaling factor multiplied by the leakage CIR measured beforehand and stored on the device, other numerical methods can be used to determine the leakage factor θ. For example, the squared absolute difference or any other kind of distance measurement can also be used.

The leakage factor θ can be used to perform leakage cancellation. For example, the leakage factor θ can perform leakage cancellation when used in Equation 12:

$$CIR_{can,k}[k] = \begin{cases} CIR_k[n] - \theta L_k[n] & \text{for } n \in N \\ CIR_k[n] & \text{for } n \notin N \end{cases}.$$

In some embodiments, $L_k[n]$ can be measured, or precomputed, and then stored in the memory 160 for canceling leakage of a CIR of an additional antenna pair at a later time. In various embodiments, the value of $L_k[n]$ can be described as a leakage factor. In some embodiments, the leakage factor θ can be measured, or precomputed, and then stored in a template stored in the memory 160 for canceling leakage of a CIR of an additional antenna pair at a later time. Each leakage factor θ can be stored for different configurations of the electronic device 100, for example when using different transmit power. For example, the leakage factor θ can be measured and stored in the template as a part of the manufacturing process to accurately measure device-specific leakage factors θ. The processor 140 can then identify the leakage factor θ associated with the antenna pair to be used later for determining leakage in a CIR. In other embodiments, the leakage factor θ can be computed at the current time as needed in order to adjust the leakage factor θ based on a change in the transmit power.

In some embodiments, a sampling timing can be different when hardware initialization is performed. For more accurate leakage cancellation, rather than storing only one leakage CIR for one fractional sampling timing, the leakage CIR as measured using each fractional sampling timing can be stored in the template. The fractional sampling timing is defined at the receiver 230 so the processor 210 can adjust the sampling timing to maximize the signal strength. In these embodiments, the sampling timing selected during the initialization procedure can be used to select a corresponding leakage CIR that is stored in the template to be used for the leakage cancellation as described herein.

The processor 210 or 140 can identify $L_k[n]$ stored in the template in the memory 160 that is associated with the particular antenna pair. After the processor 210 has controlled the transmitter 220 to transmit a first signal and generated a CIR based on the receipt, by the receiver 230, of the reflection of the first signal, the processor 210 determines the leakage in the CIR based on the stored $L_k[n]$. After the leakage of the CIR has been determined, the processor can cancel the determined leakage from the CIR and perform object detection based on the leakage canceled CIR.

In some embodiments, the leakage factor β can be the same as the leakage factor θ. The leakage factor β can also be stored in a template in the memory 160 that is the same or different template that stores the leakage factor θ. The processor 210 can control a second transmitter 220 of a second antenna pair to transmit an additional signal a generate a second CIR based on the receipt, by a second receiver 230 of the second antenna pair, of the reflection of the first signal. The processor 210 can then determine the leakage of the second CIR based on the leakage factor β and cancel the determined leakage from the second CIR. The processor 210 can then perform object detection based on the leakage canceled second CIR.

Figure 7:
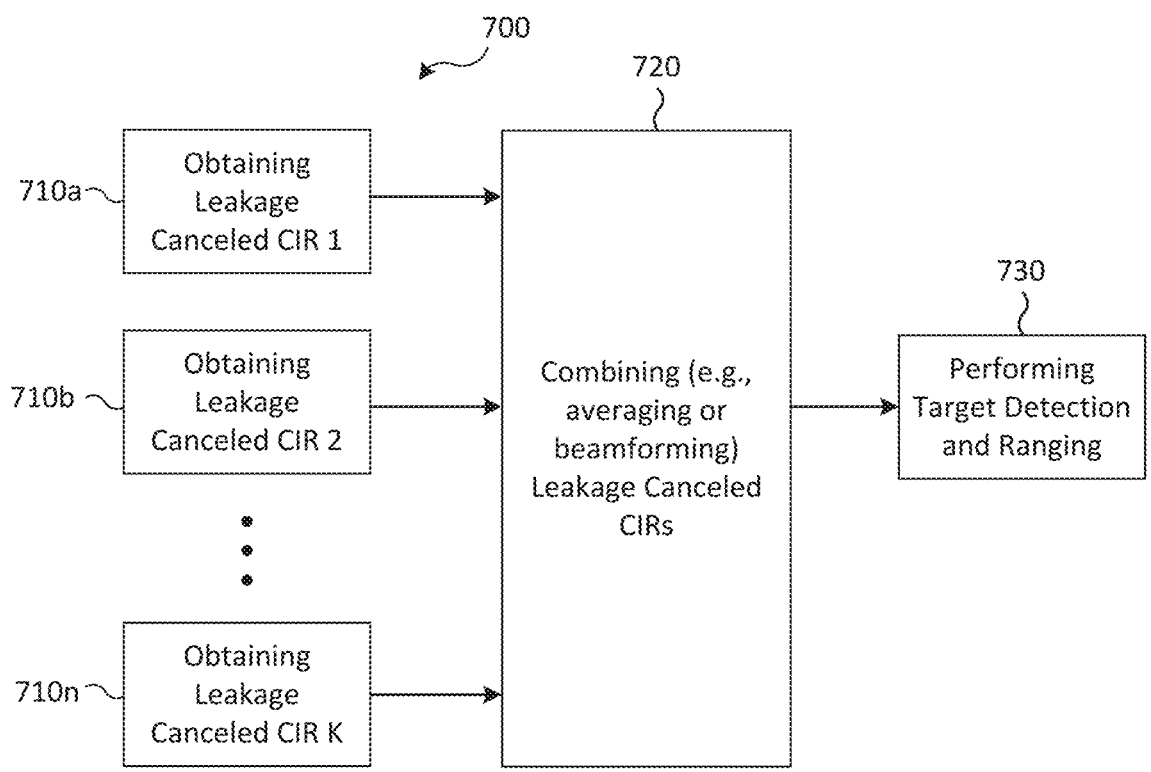
FIG. 7 illustrates a method of combining multiple leakage canceled CIRs according to various embodiments of the present disclosure.

FIG. 7 illustrates a method of combining multiple leakage canceled CIRs according to various embodiments of the present disclosure. In some embodiments, the processor 140 can utilize M antenna pairs rather than one or two pairs of antennas k or l as described in FIG. 6, where M represents the number of antenna pairs. Using M antenna pairs rather than a single pair provides multiple estimates of the CIR after the leakage cancellation. The multiple estimates can be combined for better performance, such as an improvement in the signal-to-noise ratio, before the processor 140 performs the detection and ranging procedure.

The number of groupings of two pairs can be selected in various ways. For example, if absolute independence between the leakage canceled CIRs is desirable, then the M pairs can be used to form M/2 non-overlap groups of two pairs. In this embodiment, M is described as an even number. In other embodiments where M is an odd number, a floor function can be used to avoid inaccurate calculations. If the independence criterion is not required, then the M pairs can be used to form M−1 groups of two pairs. Although depicted herein as M/2 or M−1 groups of two pairs, these embodiments should not be construed as limiting. Other embodiments are possible. The method 700 depicts combining leakage canceled CIRs of antenna pairs M for more robust target detection and ranging.

In operation 710, various leakage canceled CIRs are obtained. For example, a leakage canceled CIR 1 is obtained in operation 710*a*, a leakage canceled CIR 2 is obtained in operation 710*b*, and a leakage canceled CIR K is obtained in operation 710*n*. The leakage canceled CIR K obtained in operation 710*n* can be understood to represent any number of leakage canceled CIRs from antenna pairs M that are obtained in operation 710. The leakage canceled CIRs 1, 2, . . . n can be obtained by one or more of the methods described in the description of FIG. 6. Each leakage canceled CIR can be obtained from a pair of antenna arrays as described in FIG. 6. For example, each of the leakage canceled CIRs can be described as $CIR_{can}[n]$.

In operation 720, each of the leakage canceled CIRs 1, 2, . . . n obtained in operation 710 are combined by the processor 140. Each of the leakage canceled CIRs 1, 2, . . . n can be combined in various ways. In some embodiments, the processor 140 can combine the leakage canceled CIRs 1, 2, . . . n by computing the average of the leakage canceled CIRs 1, 2, ... n. The computed average can be in a complex domain or in the power domain, such as the squared amplitude of the complex number. In other embodiments, the processor 140 can combine the leakage canceled CIRs 1, 2, ... n by performing beamforming on the leakage canceled CIRs 1, 2, ... n. For example, the processor 140 can use a maximum ratio combining (MRC) approach to combine the leakage canceled CIRs 1, 2, ... n.

In other embodiments, the processor 140 can compute the results of the leakage canceled CIRs 1, 2, ... n obtained in operation 710 by using a weighted average, the maximum value, or the minimum value. The weighted average can be used to establish a higher weight, i.e. priority, to the leakage canceled CIR of a particular antenna pair. For example, the processor 140 can determine a SNR for each antenna pair of the antenna pairs M using Equation 4, $$SNR = \frac{P_R}{kT \cdot B \cdot F},$$

and compare the respective SNR values of each of the antenna pairs M to determine a weighted average for the results of operation 710.

In operation 730, the processor 140 performs target detection and ranging based on the results of the combined leakage canceled CIRs in operation 720. For example, the processor 140 can detect a target based on a peak remaining in the CIR after the leakage has been canceled. The processor 140 can further determine the distance of the detected target based on the tap index as shown in the CIR illustrated in FIG. 2.

Figure 8:
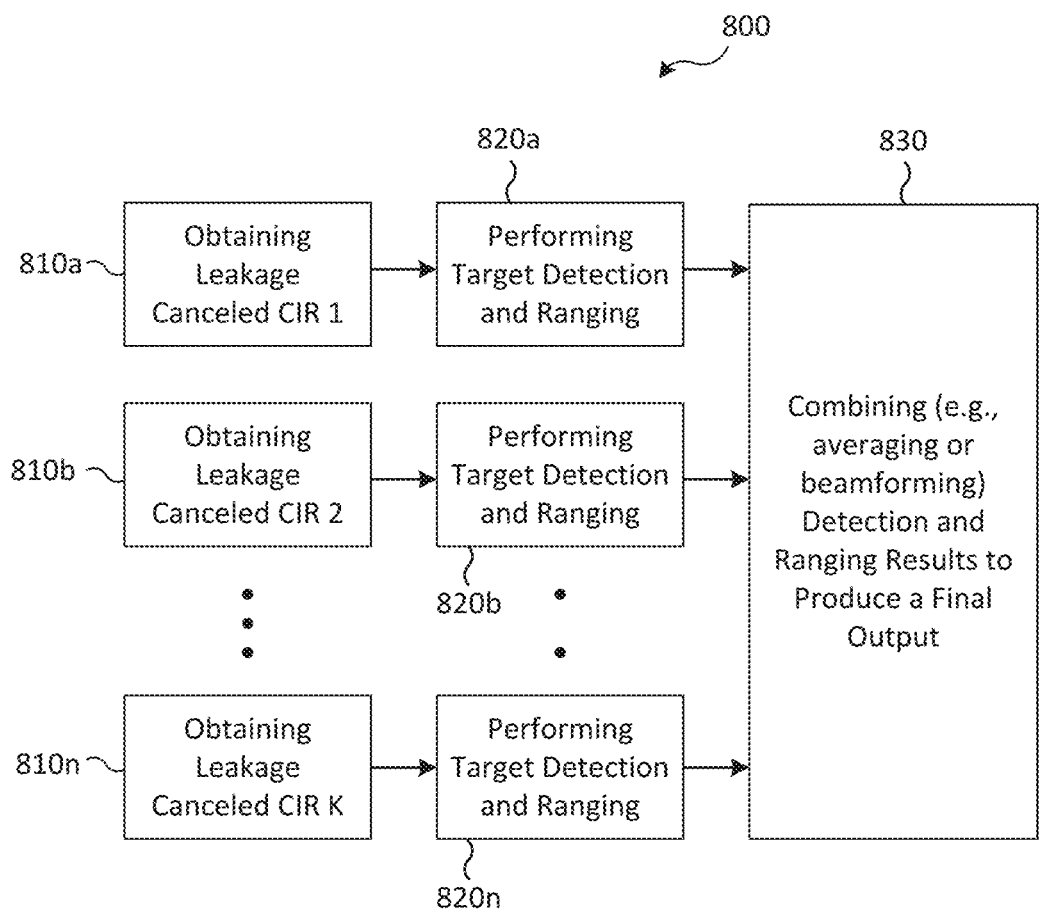
FIG. 8 illustrates a method of combining multiple leakage canceled CIRs according to various embodiments of the present disclosure.

FIG. 8 illustrates a method of combining multiple leakage canceled CIRs according to various embodiments of the present disclosure. In some embodiments, the processor 140 can utilize M antenna pairs rather than a single pair of antennas k and l as described in FIG. 6, where M represents the number of antenna pairs. Using M antenna pairs rather than a single pair provides multiple estimates of the CIR after the leakage cancellation.

The number of groupings of two pairs can be selected in various ways. For example, if absolute independence between the leakage cancelled CIRs is desirable, then the M pairs can be used to form M/2 non-overlap groups of two pairs. If the independence criterion is not required, then the M pairs can be used to form M−1 groups of two pairs. Although depicted herein as M/2 or M−1 groups of two pairs, these embodiments should not be construed as limiting. Other embodiments are possible. The method 800 depicts performing ranging of each obtained leakage canceled CIR of antenna pairs M before combining the results of the target detection and ranging.

In operation 810, various leakage canceled CIRs are obtained. Operation 810 can be performed in the same manner as operation 710. For example, a leakage canceled CIR 1 is obtained in operation 810a, a leakage canceled CIR 2 is obtained in operation 810b, and a leakage canceled CIR K is obtained in operation 810n. The leakage canceled CIR K obtained in operation 810n can be understood to represent any number of leakage canceled CIRs from antenna pairs M that are obtained in operation 810. The leakage canceled CIRs 1, 2, . . . n can be obtained by one or more of the methods described in the description of FIG. 6. Each leakage canceled CIR can be obtained from a pair of antenna elements as described in FIG. 6. For example, each of the leakage canceled CIRs can be described as $CIR_{can}[n]$.

In operation 820, the processor 140 performs target detection and ranging based on each individually obtained leakage canceled CIR. For example, in operation 820a, the processor 140 controls to perform target detection and ranging based on the obtained leakage canceled CIR 1 in operation 810a. In 820b, the processor 140 controls to perform target detection and ranging based on the obtained leakage canceled CIR 2 in operation 810b. In 820n, the processor 140 controls to perform target detection and ranging based on the obtained leakage canceled CIR K in operation 810n. The target detection and ranging procedure for each of operations 820a, 820b, and 820n can include detecting a target based on a peak remaining in each respective leakage canceled CIR. The processor 140 can further determine the distance of the detected target based on the tap index of the detected target in the CIR.

In operation 830, the processor 140 combines the results of the target detection and ranging in operation 820 from each respective leakage canceled CIR to produce a final detection and estimation output. The processor 140 can combine the results in various ways, such as using an average, a weighted average, using the maximum value, and using the minimum value. For example, if three antenna pairs are used at operations 820a, 820b, and 820n and targets are detected at 5 cm, 7 cm, and 9 cm from the electronic device 100, respectively, the processor 140 can produce a final output that differs based on the method of combining. If the processor 140 averages the results of operation 820 to produce the final output, the final output would show a target at 7 cm from the electronic device 100. If the processor 140 uses the maximum value, the final output would show a target at 9 cm from the electronic device 100. If the processor 140 uses the minimum value, the final output would show a target at 5 cm from the electronic device 100.

In some embodiments, when the processor 140 uses weighted averaging to combine the results of operation 820, the processor 140 can use the SNR of the detected signals as the weights to establish a higher weight, i.e. priority, to a particular antenna pair of the antenna pairs M. For example, the processor 140 can determine a SNR for each antenna pair of the antenna pairs M using Equation 4, $$SNR = \frac{P_R}{kT \cdot B \cdot F},$$

and compare the respective SNR values of each of the antenna pairs M to determine a weighted average for the results of operation 820. In the example above, where three antenna pairs are used at operations 820a, 820b, and 820n and targets are detected at 5 cm, 7 cm, and 9 cm from the electronic device 100, respectively, the average is 7 cm. However, using a weighted average where the antenna pair that detects a target at 5 cm has the highest SNR value and is included twice in the weighted average calculation, the weighted average is 6.5 cm. In this example, the final output of operation 830 can show a detected target at 6.5 cm.

In some embodiments, the processor 140 can control to output a binary output. For example, the processor 140 can control to output a result indicating that a target is either present or not present in the range or that a target is either present or not present at a particular tap index. In embodiments where the processor 140 controls to output a binary result, the processor 140 can combine the target detection and ranging results by a majority vote approach. For example, where three antenna pairs are used at operations 820a, 820b, and 820n and targets are detected in operations 820a and 820b but no target is detected in operation 820n, a majority vote approach leads the processor 140 to control to output a result indicating a detected target because the two out of three antenna pairs that detected the target constitutes a majority. As another example, the output can be a binary output of whether a target is detected at a particular tap index. In the example where three antenna pairs are used at operations 820a, 820b, and 820n and targets are detected in operations 820a and 820b at the tap index of 11 but no target is detected in operation 820n at the tap index of 11, the majority vote approach leads the processor 140 to control to output a result indicating a detected target at the tap index of 11 because the two out of three antenna pairs that detected the target at the tap index of 11 constitutes a majority.

Figure 9:
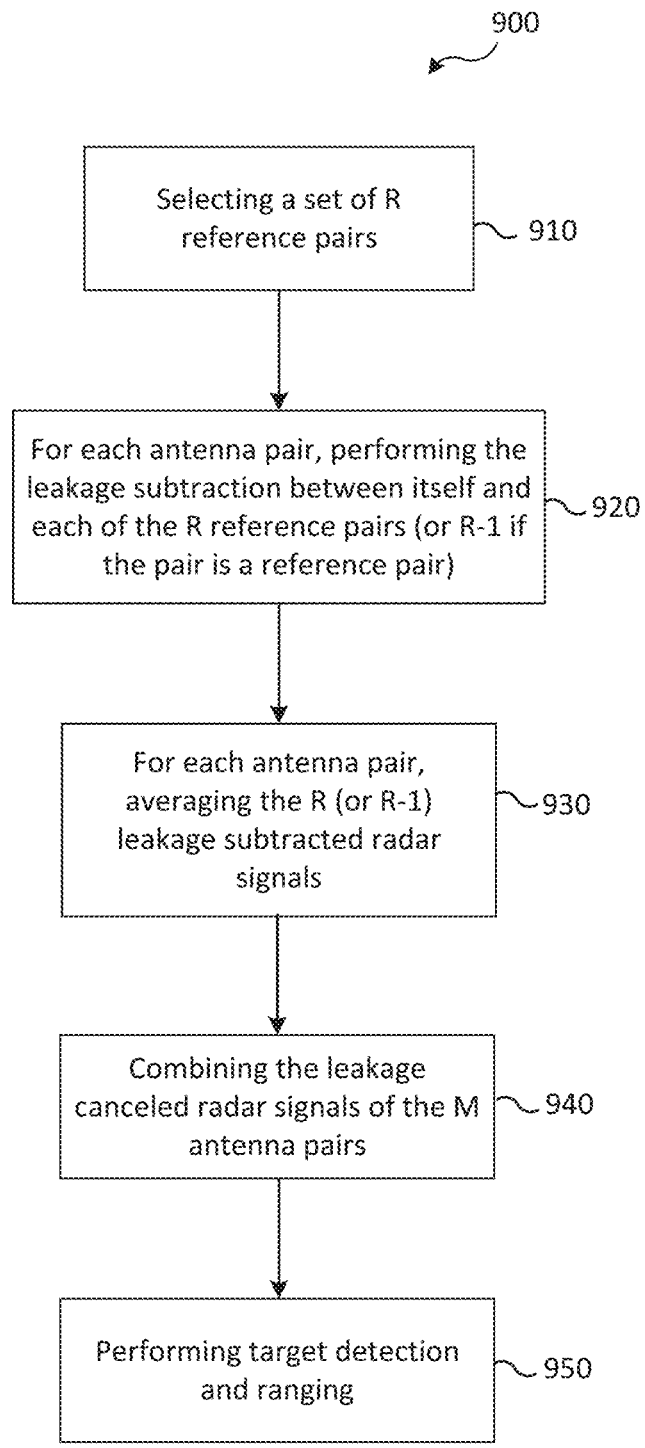
FIG. 9 illustrates an example of spatial leakage cancellation according to various embodiments of the present disclosure.

FIG. 9 illustrates an example of spatial leakage cancellation according to various embodiments of the present disclosure. In particular, FIG. 9 illustrates a method 900 of spatial leakage cancellation using M antenna pairs.

In operation 910, a set of reference pairs, R, are selected from the M antenna pairs. M represents the number of antenna pairs on the electronic device and can be the M antenna pairs described in FIGS. 7 and 8. The set of reference pairs R can be selected based on various criteria. For example, the set of reference pairs R can be selected differently for different delay taps. The set of reference pairs R can be selected from an index that corresponds the set of reference antenna pairs R to a particular delay tap. In some embodiments, the same set of reference pairs can be used for all delay taps that leakage cancellation will be performed on throughout the method 900. For example, one antenna pair of the set of reference pairs R can be the transmission antenna array 610 and element 1 of the reception antenna array 620 and the second antenna pair can be element 2 of the transmission antenna array 610 and element 2 of the reception antenna array 620.

In operation 920, for each of the antenna pairs M on the electronic device, the leakage is canceled using the reference pairs R. In some embodiments, the leakage can be canceled by subtracting the leakage from the CIR of the reference pairs R after scaling by the corresponding leakage scaling factor. An antenna pair can include element 3 of the transmission antenna array 610 and element 3 of the reception antenna array 620, element 4 of the transmission antenna array 610 and element 4 of the reception antenna array 620, and so forth. During operation 920 as the leakage from each antenna pair on the electronic device 600 is subtracted using the reference pairs R, the reference pairs R will be included in the leakage cancellation. When the antenna pair being subtracted using the reference pairs R is one of the reference pairs, the leakage is subtracted by excluding the reference pair as the reference. The leakage subtraction can be depicted as using R–1 reference pairs. Based on the leakage subtraction for each of the antenna pairs on the electronic device 100, the non-reference antenna pairs have an R leakage subtracted radar signal and the reference antenna pair R have an R–1 leakage subtracted radar signal. The radar signals can be depicted as a CIR as previously described herein.

In operation 930, for each antenna pair, the leakage subtracted CIRs are averaged. For example, when one antenna includes element 3 of the transmission antenna array 610 and element 3 of the reception antenna array 620 and the other antenna includes element 4 of the transmission antenna array 610 and element 4 of the reception antenna array 620, the leakage subtracted radar signals of the two antennas are averaged to obtain an averaged leakage canceled, or subtracted, radar signal. In operation 940, the averaged leakage canceled CIRs of the antenna pairs M are combined. For example, the M leakage canceled CIRs can be averaged or combined using a beamforming method. Although operations 930 and 940 are described herein as being performed in sequence, in some embodiments operations 930 and 940 can be performed as a single combined step. For example, the processor 140 can average each of the R leakage subtracted radar signals and R–1 leakage subtracted radar signals to result in a combined leakage subtracted radar signal. The combined leakage subtracted radar signal is the final output of the leakage cancellation.

In operation 950, the processor 140 performs target detection and ranging based on the combined leakage canceled radar signals of the antenna pairs M. The target detection and ranging can include detecting a target based on a peak remaining in the combined leakage canceled CIR. The processor 140 can further determine the distance of the detected target based on the tap index of the detected target in the CIR.

Figure 10:
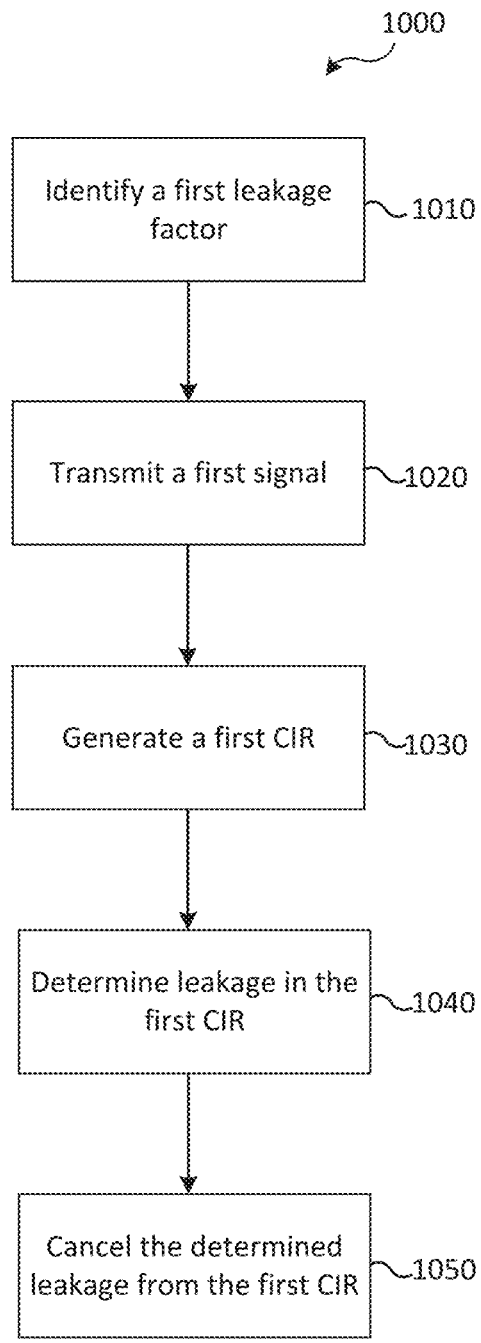
FIG. 10 illustrates a method of leakage cancellation according to various embodiments of the present disclosure.

FIG. 10 illustrates an example method of leakage cancellation according to various embodiments of the present disclosure. For example, FIG. 10 illustrates a method 1000 of canceling leakage for radar applications as described throughout the present disclosure.

In operation 1010, the processor 140 identifies a first leakage factor. For example, the processor 140 can identify the first leakage factor from leakage factors that are stored in an index in the memory 160.

In operation 1020, the processor 140 controls the transmit antenna to transmit a first signal. For example, the transmit antenna can be the transmitter 157 that transmits a radar signal or radar pulse. The radar signal or pulse can then be reflected off of a target object and then received by a receiving antenna such as the receiver 230. The transmit antenna can be included in an antenna pair that includes the transmit antenna and a receiver antenna.

In operation 1030, the processor 140 generates a first CIR based on the reflected radar signal that is received by the receiving antenna. The first CIR can be a CIR such as the CIR depicted in FIG. 3. The generated CIR is a measure of the reflected signals, or echoes, from one or more potential targets as a function of a distance at the receiving antenna. The y-axis can measure an amplitude of the radar measurement in dB and the x-axis can measure a delay tap index corresponding to distance from the receiving antenna.

In operation 1040, the processor 140 determines the leakage in the first CIR. The leakage in the first CIR can be determined based on at least the first leakage factor identified in operation 1010. More specifically, the processor 140 can apply the first leakage factor to the first CIR generated in operation 1030 to determine leakage in the first CIR.

In operation 1050, the processor 140 cancels the determined leakage from the first CIR. By canceling the determined leakage from the first CIR, the leakage canceled CIR more accurately depicts the potential target objects in the environment surrounding the electronic device 100.

In some embodiments, the electronic device 100 can further include a second antenna pair comprising a second transmitter antenna configured to transmit signals and a second receiver antenna configured to receive signals. The first leakage factor can be a leakage scaling factor for relative leakage cancellation between the first antenna pair and the second antenna pair. In these embodiments, the processor 140 can control the second transmitter antenna to transmit a second signal, generate a second CIR based on receipt, by the second receiver antenna, of reflection of the second signal, and, to determine the leakage in the first CIR, determine the leakage in the first CIR based on the leakage scaling factor and the second CIR.

In some embodiments, the processor 140 can divide the first CIR by the second CIR to determine the leakage scaling factor. The first CIR can be generated based on a receiver antenna gain of the first antenna pair, a propagation coefficient of the first antenna pair, a transmitter antenna gain of the first antenna pair, and a transmitter and receiver combined filter response of the first antenna pair. The second CIR can be generated based on a receiver antenna gain of the second antenna pair, a propagation coefficient of the second antenna pair, a transmitter antenna gain of the second antenna pair, and a transmitter and receiver combined filter response of the second antenna pair.

In some embodiments, the processor 140 can select a set of reference antenna pairs based on more than two antenna pairs being present on the electronic device 100. For each additional antenna pair, the processor 140 can cancel leakage of the additional antenna pair from leakage of each reference antenna pair of the set of reference antenna pairs to generate a leakage canceled CIR. The processor 140 can then average the leakage canceled CIRs generated from each reference antenna pair of the set of reference antenna pairs.

In some embodiments, to select the set of reference antenna pairs, the processor 140 is configured to select the set of reference antenna pairs from an index that corresponds the set of reference antenna pairs to a particular delay tap.

In some embodiments, the memory 160 is configured to store the first leakage factor in a template. The processor 140 can select the first leakage factor from the template and cancel leakage from an additional CIR that is obtained by an additional antenna pair based on the first leakage factor that is selected from the template.

In some embodiments, the processor 140 can perform object detection using the leakage canceled first CIR.

None of the description in this application should be read as implying that any particular element, step, or function is an essential element that must be included in the claim scope. Moreover, none of the claims is intended to invoke 35 U.S.C. § 112(f) unless the exact words "means for" are followed by a participle.

What is claimed is:

1. An electronic device comprising:
   a first antenna pair comprising a first transmitter antenna configured to transmit signals and a first receiver antenna configured to receive signals;
   a memory configured to store data; and
   a processor operably connected to the first antenna pair, the processor configured to:
   identify, from the data stored in the memory, a first leakage factor associated with at least the first antenna pair;
   control the first transmitter antenna to transmit a first signal;
   generate a first channel impulse response (CIR) based on receipt, by the first receiver antenna, of reflection of the first signal;
   determine leakage in the first CIR based on at least the identified first leakage factor; and
   cancel the determined leakage from the first CIR.

2. The electronic device of claim 1, further comprising a second antenna pair comprising a second transmitter antenna configured to transmit signals and a second receiver antenna configured to receive signals, wherein:
   the first leakage factor is a leakage scaling factor for relative leakage cancelation between the first antenna pair and the second antenna pair; and
   the processor is configured to:
   control the second transmitter antenna to transmit a second signal,
   generate a second CIR based on receipt, by the second receiver antenna, of reflection of the second signal, and
   to determine the leakage in the first CIR, determine the leakage in the first CIR based on the leakage scaling factor and the second CIR.

3. The electronic device of claim 2, wherein the processor is configured to:
   divide the first CIR by the second CIR to determine the leakage scaling factor, wherein:
   the first CIR is generated based on a receiver antenna gain of the first antenna pair, a propagation coefficient of the first antenna pair, a transmitter antenna gain of the first antenna pair, and a transmitter and receiver combined filter response of the first antenna pair, and
   the second CIR is generated based on a receiver antenna gain of the second antenna pair, a propagation coefficient of the second antenna pair, a transmitter antenna gain of the second antenna pair, and a transmitter and receiver combined filter response of the second antenna pair, and
   control the memory to store the leakage scaling factor.

4. The electronic device of claim 1, wherein the processor is configured to:
   based on more than two antenna pairs being present on the electronic device, select a set of reference antenna pairs;
   for each additional antenna pair, cancel leakage of the additional antenna pair from leakage of each reference antenna pair of the set of reference antenna pairs to generate a leakage canceled CIR; and
   average the leakage canceled CIRs generated from each reference antenna pair of the set of reference antenna pairs.

5. The electronic device of claim 4, wherein, to select the set of reference antenna pairs, the processor is configured to select the set of reference antenna pairs from an index that corresponds the set of reference antenna pairs to a particular delay tap.

6. The electronic device of claim 1, wherein:
   the memory is configured to store the first leakage factor in a template; and
   the processor is configured to:
   select the first leakage factor from the template, and
   cancel leakage from an additional CIR obtained by an additional antenna pair based on the first leakage factor selected from the template.

7. The electronic device of claim 1, wherein the processor is configured to perform object detection using the leakage canceled first CIR.

8. A method for leakage cancelation, the method comprising:
   identifying, from data stored in a memory of an electronic device, a first leakage factor associated with at least a first antenna pair of the electronic device, the first antenna pair comprising a first transmitter antenna and a first receiver antenna;
   transmitting, via the first transmitter antenna, a first signal;

generating a first channel impulse response (CIR) based on receipt, by the first receiver antenna, of reflection of the first signal;
determining leakage in the first CIR based on at least the identified first leakage factor; and
canceling the determined leakage from the first CIR.

9. The method of claim 8, wherein the first leakage factor is a leakage scaling factor for relative leakage cancelation between the first antenna pair and a second antenna pair of the electronic device, the second antenna pair including a second transmitter antenna and a second receiver antenna, the method further comprising:
transmitting, via the second transmitter antenna, a second signal; and
generating a second CIR based on receipt, by the second receiver antenna, of reflection of the second signal,
wherein determining the leakage in the first CIR comprises determining the leakage in the first CIR based on the leakage scaling factor and the second CIR.

10. The method of claim 9, further comprising
determining the leakage scaling factor by dividing the first CIR by the second CIR, wherein:
the first CIR is generated based on a receiver antenna gain of the first antenna pair, a propagation coefficient of the first antenna pair, a transmitter antenna gain of the first antenna pair, and a transmitter and receiver combined filter response of the first antenna pair, and
the second CIR is generated based on a receiver antenna gain of the second antenna pair, a propagation coefficient of the second antenna pair, a transmitter antenna gain of the second antenna pair, and a transmitter and receiver combined filter response of the second antenna pair, and
storing the leakage scaling factor in the memory.

11. The method of claim 8, further comprising:
based on more than two antenna pairs being present on the electronic device, selecting a set of reference antenna pairs;
for each additional antenna pair, canceling leakage of the additional antenna pair from leakage of each reference antenna pair of the set of reference antenna pairs to generate a leakage canceled CIR; and
averaging the leakage canceled CIRs generated from each reference antenna pair of the set of reference antenna pairs.

12. The method of claim 11, wherein selecting the set of reference antenna pairs comprises selecting the set of reference antenna pairs from an index that corresponds the set of reference antenna pairs to a particular delay tap.

13. The method of claim 8, wherein the first leakage factor is stored in a template, the method further comprising:
selecting the first leakage factor from the template; and
canceling leakage from an additional CIR obtained by an additional antenna pair based on the first leakage factor selected from the template.

14. The method of claim 8, further comprising performing object detection using the leakage canceled first CIR.

15. A non-transitory, computer-readable medium storing instructions that, when executed by a processor, cause the processor to:
identify, from data stored in a memory of an electronic device, a first leakage factor associated with at least a first antenna pair of the electronic device, the first antenna pair comprising a first transmitter antenna and a first receiver antenna;
control the first transmitter antenna to transmit, via the first transmitter antenna, a first signal;
generate a first channel impulse response (CIR) based on receipt, by the first receiver antenna, of reflection of the first signal;
determine leakage in the first CIR based on at least the identified first leakage factor; and
cancel the determined leakage from the first CIR.

16. The non-transitory, computer-readable medium of claim 15, wherein:
the first leakage factor is a leakage scaling factor for relative leakage cancelation between the first antenna pair and a second antenna pair of the electronic device, the second antenna pair including a second transmitter antenna and a second receiver antenna; and
the non-transitory computer readable medium further stores instructions that, when executed by the processor, cause the processor to:
transmit, via the second transmitter antenna, a second signal,
generate a second CIR based on receipt, by the second receiver antenna, of reflection of the second signal, and
to determine the leakage in the first CIR, determine the leakage in the first CIR based on the leakage scaling factor and the second CIR.

17. The non-transitory, computer-readable medium of claim 16, wherein the non-transitory computer readable medium further stores instructions that, when executed by the processor, cause the processor to:
divide the first CIR by the second CIR to determine the leakage scaling factor, wherein:
the first CIR is generated based on a receiver antenna gain of the first antenna pair, a propagation coefficient of the first antenna pair, a transmitter antenna gain of the first antenna pair, and a transmitter and receiver combined filter response of the first antenna pair, and
the second CIR is generated based on a receiver antenna gain of the second antenna pair, a propagation coefficient of the second antenna pair, a transmitter antenna gain of the second antenna pair, and a transmitter and receiver combined filter response of the second antenna pair, and
control the memory to store the leakage scaling factor.

18. The non-transitory, computer-readable medium of claim 15, wherein the non-transitory computer readable medium further stores instructions that, when executed by the processor, cause the processor to:
based on more than two antenna pairs being present on the electronic device, select a set of reference antenna pairs;
for each additional antenna pair, cancel leakage of the additional antenna pair from leakage of each reference antenna pair of the set of reference antenna pairs to generate a leakage canceled CIR; and
average the leakage canceled CIRs generated from each reference antenna pair of the set of reference antenna pairs.

19. The non-transitory, computer-readable medium of claim 18, wherein the non-transitory computer readable medium further stores instructions that, when executed by the processor, cause the processor to select the set of reference antenna pairs from an index that corresponds the set of reference antenna pairs to a particular delay tap.

20. The non-transitory, computer-readable medium of claim 15, wherein:

the first leakage factor is stored in a template; and
the non-transitory computer readable medium further stores instructions that, when executed by the processor, cause the processor to:
select the first leakage factor from the template,
cancel leakage from an additional CIR obtained by an additional antenna pair based on the first leakage factor selected from the template, and
perform object detection using at least one of the leakage canceled first CIR or the leakage canceled from the additional CIR.

\* \* \* \* \*